Patented Aug. 11, 1925.

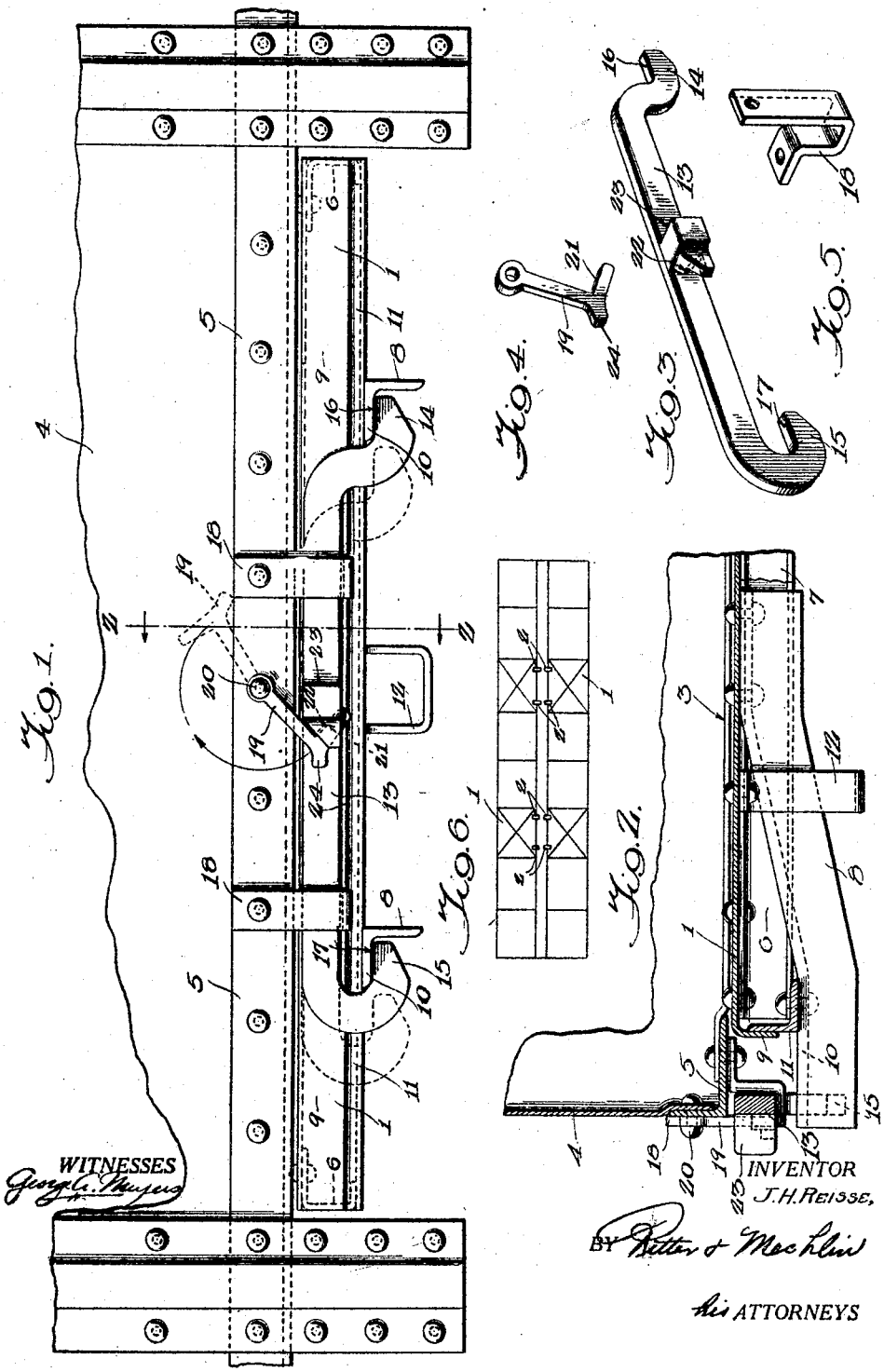

1,548,903

UNITED STATES PATENT OFFICE.

JULIUS H. REISSE, OF CHICAGO, ILLINOIS, ASSIGNOR TO WINE RAILWAY APPLIANCE COMPANY, OF TOLEDO, OHIO, A CORPORATION OF OHIO.

CAR-DOOR MECHANISM.

Application filed August 24, 1923. Serial No. 659,100.

*To all whom it may concern:*

Be it known that I, JULIUS H. REISSE, a citizen of the United States, residing at Chicago, in the county of Cook and State of Illinois, have invented certain new and useful Improvements in Car-Door Mechanism; and I do hereby declare the following to be a full, clear, and exact description of the invention, such as will enable others skilled in the art to which it appertains to make and use the same.

My invention relates to car door mechanism for retaining the drop doors of railway cars in closed position, and has for its object to provide a mechanism for that purpose which is of simple and rugged form, and is easily operated and reliable in service.

The principle feature of the invention, generally stated, consists in mounting upon the car body a slidable locking bar which when moved in one direction is adapted simultaneously to engage and support a plurality of spaced arms carried by the drop door of the car and projecting outwardly beyond a free edge thereof, the said locking bar being adapted, when moved in the opposite direction, to be disengaged from the said arms so as to release the door and permit it to open.

Another feature of the invention consists in slidably mounting upon the car body a locking bar adapted to engage simultaneously a plurality of flanged door arms secured to the door and projecting beyond an edge thereof, the locking bar being adapted to engage one of the flanges of each of the said flanged arms for the purpose of supporting the door in closed position.

A further feature of the invention consists in providing the drop door of a car with a plurality of arms projecting outwardly beyond the free edge thereof, and in combining therewith a slidable member adapted to engage said arms to support the door in closed position, the slidable member being fashioned with offset portions respectively adapted to extend beneath and engage those portions of the arms which project beyond the door.

Other features of the invention, pertaining to particular relations of parts and special structural details, will hereinafter appear.

In the drawings illustrating a preferred embodiment of the invention, the scope whereof is pointed out in the claims,—

Figure 1 is a side elevation of a portion of a car in which the invention is embodied, the normal relations of parts of the mechanism when the door in closed being illustrated in full lines, and their relation when the door is released being shown in dotted lines.

Figure 2 is a detail sectional view on the line 2—2, Fig. 1.

Figure 3 is a perspective view of the slidable locking bar or member.

Figure 4 is a perspective view of a pivoted latch which it is preferred to employ for the purpose of preventing the slidable locking bar from accidentally moving to unlocked position.

Figure 5 is a perspective view of one of the supporting guides or stirrups by which the locking bar is slidably mounted on the car body.

Figure 6 is a diagrammatic plan view showing the preferred location of the drop doors of the car.

The car which has been chosen for the purpose of explaining the invention, but without intent thereby to limit the scope of the claims to the illustrated details of car construction, is of the steel gondola type having four drop doors 1 hinged along the center sills of the car, as at 2, by means of suitable hinges in any usual or desirable manner. These doors normally serve to close corresponding openings formed in the floor 3 of the car through which the cargo may discharge when the doors are open.

The walls and floor 3 of the car body are preferably formed of steel plates, the side walls 4 being reinforced along their lower edges by stiffening angles 5 riveted to the respective car sides and to overlapping portions of the floor plates 3. The doors 1 may be made of steel plates to the under sides of which are firmly riveted flanged reinforcing members 6 and 7 extending from the hinge edges of the respective doors substantially to their outer or free edges, the reinforcing members 6 being disposed along the side edges of the door and the reinforcing members 7 being centrally located.

Securely riveted to the under side of the door 1 are a plurality of spaced arms 8 which extend outwardly beyond the flanged edge 9 of the door. These arms, which are preferably of angle iron form, are so arranged that their horizontal flanges 10 extend in the same direction from their respective vertical flanges or legs. The intermediate portions of the arms 8 are inclined, so that the outer ends of said arms are spaced away from the plane of the door plate and pass beneath the marginal flange 9 at the outer edge of the latter. The door arms are maintained in proper spaced relation by being riveted to an angle iron 11 bordering the free edge of the door just inside of the marginal stiffening flange 9. As shown in the drawings, the flanged door stiffeners 6 and 7 are preferably seated upon the lower flange of the angle iron 11, thus providing for the efficient distribution of the strains incident to the load upon the door. Each of the doors may be advantageously provided on its under side substantially midway between the door arms 8 with a pole pocket 12 which may be formed as a stirrup riveted to the door plate. The pole pocket is adapted to receive a removable bar or pole which a trainman, standing at the side of the car, may employ to facilitate the raising of the door to closed position.

Slidably mounted upon the car body is a locking member 13 adapted simultaneously to engage both of the door arms 8 so as to support the door in closed position. This locking member may advantageously be formed as a bar provided at its ends with offset portions 14 and 15, respectively, the upper faces of which furnish respective seats 16 and 17 spaced apart to correspond to the spacing of the outer ends of the flanged door arms 8. Upon being slid in the proper direction when the door 1 is closed, the offset portions 14 and 15 of the member 13 pass beneath the horizontal flanges 10 of the door arms 8, so that said flanges engage and bear upon the correspondingly adjacent seats 16 and 17 of the locking bar. The door 1 is thus maintained in closed position, the load imparted to the locking bar by the door being transmitted to the car body by stirrups or yokes 18 riveted to the car and forming guides and supports for the said locking bar 13. The stirrups 18 may advantageously extend below the floor line of the car so that the slidable locking member 13 may be mounted on the car body in a position beneath the floor where it is well protected against injury.

Accidental sliding movement of the locking member 13 permitting the door 1 to open is preferably prevented by means of a latch 19 pivoted upon the car body by a rivet 20. The latch 19 is provided with a lug or shoulder 21 adapted to engage a cooperating shoulder 22 with which the slidable locking bar 13 is furnished. When the pivoted latch 19 is in the position shown in full lines in Fig. 1 of the drawings, its shoulder 21 stands behind the shoulder 22 of the locking bar and thereby locks the latter in its door supporting position. When the pivoted latch 19 is swung to the position illustrated in dotted lines in Fig. 1 the slidable locking bar 13 may be shifted so as to release it from supporting engagement with the horizontal flanges 10 of the door arms 8, thereby unlocking the door 1 and permitting it to open.

The locking member 13 is preferably provided with a projection affording a striking face 23 readily enabling the trainman to drive said member to the position permitting the door to swing open. The pivoted latch 19 is also preferably provided with a lug 24 affording striking faces permitting said latch to be driven into locking engagement with said slidable bar 13 or out of engagement therewith, as occasion may require.

I claim:—

1. In a car, the combination with a drop door, of a plurality of spaced arms rigidly secured to said door and projecting outwardly beyond an edge thereof, a slidable member mounted on said car and adapted to engage said arms simultaneously so as to support said door in closed position, and means for preventing said slidable member from accidentally assuming a position permitting said door to open.

2. In a car, the combination with a drop door, of a plurality of spaced arms rigidly secured to said door and projecting outwardly beyond an edge thereof, and a slidable member provided with a plurality of spaced seats respectively adapted to engage and support said arms, said slidable member being provided with a shoulder forming a striking face enabling said slidable member to be driven to a position effecting the release of said door.

3. In a car, the combination with a drop door having a hinge axis parallel to the longitudinal axis of the car and having its free edge disposed inwardly of the adjacent side wall of the car, of a plurality of spaced arms rigidly secured to the under side of said door and projecting outwardly beyond the said free edge of the latter, and a slidable locking bar for simultaneously engaging said arms to support said door in closed position, said locking bar being mounted on the car body below the floor line thereof.

4. In a car, the combination with a drop door, of a plurality of flanged arms rigidly secured to said door and projecting outwardly beyond the free edge thereof, and a locking bar slidably mounted upon the body of the car and adapted to engage one of the flanges of each of said flanged arms to support said door in closed position.

5. In a car, the combination with a drop door, of a plurality of arms secured to the under side of said door and projecting outwardly beyond the free edge thereof, a slidable member adapted to engage said arms to support said door in closed position, means secured to the car body and extending downwardly below the side thereof for supporting said slidable member, and pivoted means for engaging said slidable member to prevent accidental sliding of the latter.

6. In a car, the combination with a drop door, of a plurality of arms secured to the under side of said door and projecting outwardly beyond the free edge thereof, a slidable member having a plurality of off-set portions respectively adapted to engage said arms to support said door in closed position, means secured to the car body for guiding and supporting said slidable member, and a pivoted member adapted to engage said slidable member to prevent the latter from accidentally moving to a position permitting said door to open, said slidable member and said pivoted member being formed with cooperating shoulders, and said pivoted member having a striking face permitting it to be struck and thereby rotated.

In testimony whereof I affix my signature.

JULIUS H. REISSE.